US012639812B2

(12) United States Patent
Arroyo Camejo et al.

(10) Patent No.: US 12,639,812 B2
(45) Date of Patent: May 26, 2026

(54) CONTROL DEVICE AND METHOD FOR CONTROLLING A MEDICAL IMAGING SYSTEM

(71) Applicant: Siemens Healthineers AG, Forchheim (DE)

(72) Inventors: Silvia Bettina Arroyo Camejo, Fuerth (DE); Julian Wohlers, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 296 days.

(21) Appl. No.: 18/238,625

(22) Filed: Aug. 28, 2023

(65) Prior Publication Data

US 2024/0070856 A1     Feb. 29, 2024

(30) Foreign Application Priority Data

Aug. 29, 2022     (EP) .................................... 22192637

(51) Int. Cl.
*G06T 7/00*                (2017.01)

(52) U.S. Cl.
CPC .. *G06T 7/0012* (2013.01); *G06T 2207/30168* (2013.01)

(58) Field of Classification Search
USPC ....................................................... 382/128
See application file for complete search history.

(56) References Cited

U.S. PATENT DOCUMENTS

| | | |
|---|---|---|
| 10,489,907 B2 | 11/2019 | Rowley Grant et al. |
| 10,991,092 B2 | 4/2021 | Braun et al. |
| 11,255,943 B2 | 2/2022 | Liu et al. |
| 2010/0280378 A1 | 11/2010 | Nakahira et al. |
| 2015/0086093 A1 | 3/2015 | Fonte et al. |
| 2020/0049785 A1 | 2/2020 | Liu et al. |
| 2020/0400769 A1 | 12/2020 | Arroyo Camejo et al. |
| 2021/0183055 A1* | 6/2021 | Rao ........................ G06T 7/0012 |
| 2021/0335490 A1 | 10/2021 | Arroyo Camejo et al. |
| 2022/0068472 A1 | 3/2022 | Arroyo Camejo et al. |
| 2023/0223136 A1* | 7/2023 | Goossen ................ G16H 30/40 705/2 |

(Continued)

FOREIGN PATENT DOCUMENTS

| | | |
|---|---|---|
| EP | 2803038 A1 | 11/2014 |
| EP | 3901964 A1 | 10/2021 |

(Continued)

OTHER PUBLICATIONS

Chatelain Pierre et al: "Optimization of Ultrasound Image Quality via Visual Servoing", 2015 IEEE International Conference on Robotics and Automation (ICRA), IEEE, May 26, 2015 (May 26, 2015), pp. 5997-6002, XP033169254.

(Continued)

*Primary Examiner* — Jacky X Zheng
(74) *Attorney, Agent, or Firm* — Banner & Witcoff, Ltd.

(57)                ABSTRACT

A controller for controlling a medical imaging system may include an IQA unit which contains a number of IQA algorithms and is adapted to generate a quality metric after or during application of a control protocol for capture of this image data by the medical imaging system. The quality metric may assess the quality of the image data. The controller may be adapted to automatically control the medical imaging system based on the quality metric.

17 Claims, 3 Drawing Sheets

(56) References Cited

U.S. PATENT DOCUMENTS

2023/0352147 A1* 11/2023 Abdolell ............... G16H 40/20

FOREIGN PATENT DOCUMENTS

| EP | 3611529 B1 | 3/2022 |
| EP | 3961238 A1 | 3/2022 |

OTHER PUBLICATIONS

Cai, Jianmei et al: "Image Quality Assessment on CT Reconstruc-
tion Images: Task-specific vs. General Quality Assessment", 14th
International Meeting on Fully Three-Dimensional Image Recon-
struction in Radiology and Nuclear Medicine, Fully3D, Xi'an,
China, Jun. 18, 2017 (Jun. 18, 2017), pp. 814-819, XP040712891.
Oksuz, Ilkay et al: "Deep Learning Based Detection and Correction
of Cardiac MR Motion Artefacts During Reconstruction for High-
Quality Segmentation", arxiv.org, Cornell University Library, 201
Olin Library Cornell University Ithaca, NY 14853, Oct. 11, 2019
(Oct. 11, 2019), XP081514302.
Oksuz, Ilkay et al: "Automatic CNN-Based Detection of Cardiac
MR Motion Artefacts Using K-Space Data Augmentation and
Curriculum Learning", arxiv.org, Cornell University Library, 201
Olin Library Cornell University Ithaca, NY 14853, Oct. 29, 2018
(Oct. 29, 2018), XP080932900.

* cited by examiner

FIG 3
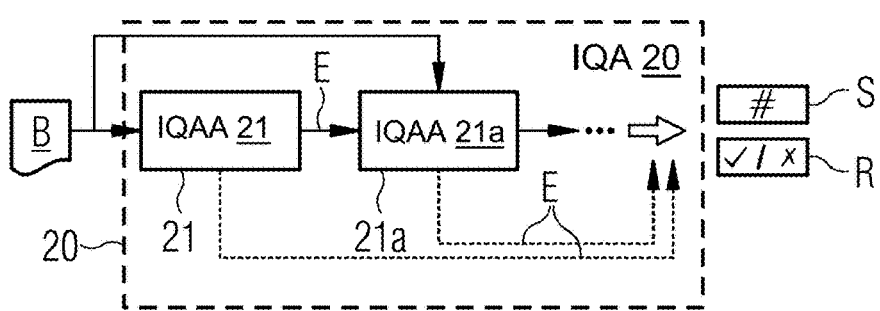
FIG 4
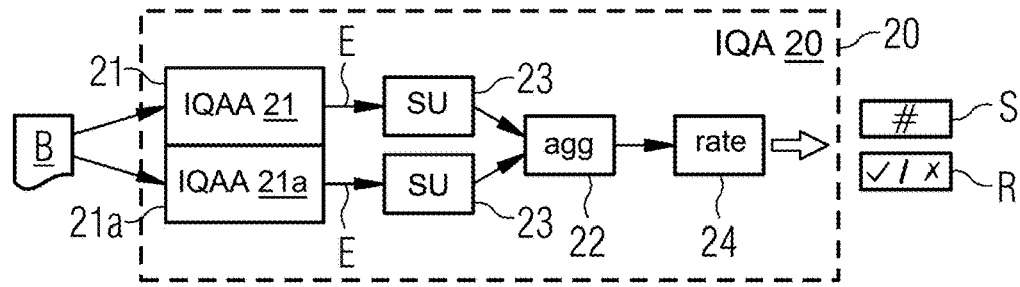
FIG 5

CONTROL DEVICE AND METHOD FOR CONTROLLING A MEDICAL IMAGING SYSTEM

CROSS REFERENCE TO RELATED APPLICATIONS

This patent application claims priority to European Patent Application No. 22192637.1, filed Aug. 29, 2022, which is incorporated herein by reference in its entirety.

BACKGROUND

Field

The disclosure relates to a controller and to a method for controlling a medical imaging system, for example a magnetic resonance tomography system (MRI system), a computed tomography system (CT system) or a positron-electron tomography system (PET system). The disclosure is in particular based on automated image quality assessment algorithms (IQA algorithms) which provide quality feedback for the user of a diagnostic scanner.

Related Art

Magnetic resonance tomography (MRI), computed tomography (CT) and positron-electron tomography (PET) are powerful and versatile investigation methods which enable doctors to obtain structural and functional information from the interior of a patient's body. The corresponding systems often offer users a plurality of setting options for imaging. For example, users of an MRI system have a plurality of imaging sequences and protocol parameters available to them for adapting MR image contrast (MR: magnetic resonance), i.e. how specific tissue characteristics or liquid perfusion and diffusion behavior are manifested in the image impression. Such setting options enable a physician to search for highly specific features in order to confirm or reject a suspected disease process.

A minimum image quality is required for a radiologist to be able reliably to carry out this diagnostic task. The necessary minimum image quality may depend on the patient's clinical indication, the suspected disease process, the region of the body and/or other factors. If this minimum image quality is not achieved and this is not noticed while the patient is still in the scanner or capture unit, it is often necessary to recall the patient, which inconveniences the patient and wastes scanner, technician and radiologist time. If the radiologist is not able to make a diagnosis due to inadequate image quality in the first scan investigation, a patient recall involves a risk of late diagnosis. Image quality problems furthermore reduce overall reading throughput due to interruption of the reading process and increase the risk of misdiagnosis or deficient findings.

Immediately after image acquisition, the user of the scanner or capture unit (i.e. the technician) normally carries out a manual image quality check with the assistance of a radiologist in particular cases. Making a reliable assessment of image quality demands a certain degree of specialist knowledge and practical experience on the part of the technician as well as an understanding of the impact of the specific indication, the suspected pathological region of the body etc. on the necessary minimum image quality. Years of training and practical experience are necessary for experienced technicians to reliably master this task for all kinds of image content (e.g. MR contrast), indications and regions of the body.

Inexperienced technicians and those working under time pressure may not be able to carry out this manual image quality assurance with a high level of accuracy. Consequences of inaccurate image quality assurance are for example underscanning (failure to recognize inadequate image quality during the investigation and recall of the patient for a follow-up investigation) or overscanning (renewed scanning of capture steps with aim of obtaining better image quality despite the image produced first having sufficient image quality for diagnostic reading). Both cases cause unnecessary scanning time, waste the radiologist's time and inconvenience the patient. Underscanning may even entail a risk of late diagnosis.

A further challenge, which is of particular relevance to healthcare providers with a relatively large fleet of scanners and/or a number of devices (e.g. a "hub and spoke" model), is variability in image quality. Variability in image quality arises from differences in scanner model, magnetic field strength, different protocol settings, patient characteristics (implants present, large, obese), patient behavior (cooperates with breathing instructions, moves about a lot) and not least the level of experience and personal preferences of the scanner user. Establishing a fleet-wide image quality standard for scanners is therefore one of the most important goals of modern, large-scale healthcare providers. There is accordingly a need for a standardized and ideally automated method for assessing the quality of each image at the time of capture in order to ensure a certain minimum image quality.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 3 shows the mode of operation of an IQA unit, according to an exemplary embodiment of the disclosure.

FIG. 4 shows a serial combination of IQA algorithms, according to an exemplary embodiment of the disclosure.

FIG. 5 shows a parallel combination of IQA algorithms, according to an exemplary embodiment of the disclosure.

Figures 1, 2:
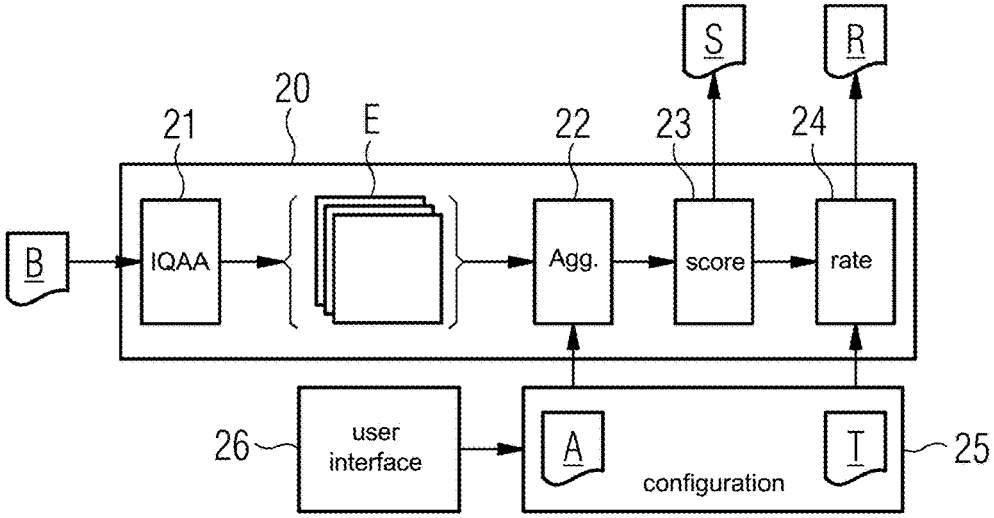
FIG. 1 is a schematic representation of a magnetic resonance tomography system according to an exemplary embodiment of the disclosure.
FIG. 2 shows an IQA unit and a configuration unit, according to exemplary embodiments of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is an object of the present disclosure to provide a controller and a method for controlling a medical imaging system, for example an MRI system, a CT system or a PET system, with which the above-described disadvantages can be avoided and in particular automated quality checking is possible.

This object is achieved by a controller according to one or more aspects of the disclosure, a method according to one or more aspects of the disclosure, and a medical imaging system according to one or more aspects of the disclosure.

A controller according to the disclosure serves to control a medical imaging system which is intended to perform image captures by way of control protocols. Such a system should in particular be taken to be a magnetic resonance tomography system (MRI system), a computed tomography system (CT system) or a positron-electron tomography system (PET system) and combinations thereof, since the disclosure is particularly advantageous for these systems. With regard to combinations, the disclosure is particularly advantageous for hybrid systems such as for example PET/CT or PET/MR, where it is frequently particularly difficult to find qualified personnel with extensive experience because these are highly specific, rare hybrid modalities which require particularly significant experience in both individual modalities. The disclosure may, however, also be advantageous for other medical imaging systems, provided they carry out automated capture of large volumes of data by way of control protocols. Although the disclosure is particularly advantageous for MRI, since captures here take a particularly long time (and the following explanations can very well be read in the light of an MRI investigation), the disclosure can certainly also be put to advantageous, practical use for CT or PET investigations since here too a scan sometimes has to be repeated a number of times until a diagnostic image is obtained and follow-up investigations due to inadequate captures are also disadvantageous.

The controller comprises an IQA unit which contains a number of IQA algorithms and is designed to generate a quality metric after or during application of a control protocol for capture of this image data by the medical imaging system, wherein the quality metric assesses the quality of the image data, and wherein the controller is designed to automatically control the medical imaging system on the basis of the quality metric.

The abbreviation "IQA" stands for "image quality assessment". Image quality assessment is already widely known in the prior art. Image data is input into an IQA algorithm (often abbreviated IQAA), processed therein and an image data quality metric is output as the result. The term image quality assessment or its abbreviation IQA are thus used in the following text.

Although the IQA algorithms are described in greater detail below, this is for the most part prior art. The disclosure also does not relate to the determination of quality per se, but to the automated control of an imaging system using the results from IQAAs. The image data quality metric from an IQAA may already be the quality metric, however the quality metric preferably is or contains a further processed result from an IQAA or a plurality of IQAAs. It should be noted that it is not necessarily only image data which has to be input into an IQAA, it also being possible to input sensor data from which image quality can be derived. For example, an IQAA can also obtain movement data from the captured patient and, in the event of a permitted movement range being exceeded, rate quality as inadequate because the patient has moved too much.

The IQA unit serves to generate the quality metric from the image data or sensor data from which image quality can be derived and, in relation to the disclosure, is the cornerstone of the controller. It should, however, be noted in this connection that the controller could fundamentally also be used for controlling the imaging system, or at least the scanner thereof, and may thus contain further components which are important for this purpose.

The IQA unit comprises a number of IQA algorithms and optionally further components, such as for example an aggregation unit for combining results from the number of IQA algorithms or other results, a scoring unit for generating a numerical value for the quality metric (e.g. from 0% to 100%) and/or a rating unit for generating a qualitative value for the quality metric (e.g. "good" or "bad"). In a very simple example, an IQA algorithm which generates a numerical metric for the quality from image data or from motion sensor data or from ECG data, may by itself constitute the IQA unit.

It should be noted that the image data may be both raw data and reconstructed image data (or a combination of the two). Image data may also originate from a spectroscopic capture. Fundamentally, this is merely dependent on the IQA algorithms used or the data format which has to be input into the IQA algorithms. If, for example, a plurality of IQA algorithms are used, some of which require raw data as input and others reconstructed images, the image data may also contain both raw data and reconstructed image data. The image data may be for example MR data, CT data or PET data.

The quality metric can be generated after or during application of a control protocol for capture of the image data, wherein the image data captured in each case is used for generating the quality metric. However, as stated, sensor data may also be used. For example, image data from one slice may already be used to generate a quality metric while a subsequent slice is being captured. Should the investigated slice be inadequate, capture can be immediately stopped and repeated or the inadequate slice can be remeasured. The same applies to sensor data. It is preferred for the quality metric to assess the quality of the image data according to known image quality assessment principles. The metric may, however, also be subject to other, previously defined criteria, for example that, in the event of major patient movement or a long movement phase, the quality metric indicates bad quality. Quality assessments and/or diagnostic image quality classes may in particular be determined for the purposes of the quality metric.

What is important is that the controller is configured such that it can automatically control the medical imaging system, to which end it should naturally also interpret the quality metric. Such control may take various forms but is always automatic, i.e. without user assistance. Control may, for example, comprise termination or repetition of the capture or of parts of the capture. Control may likewise comprise automated output of a warning or information about the quality metric. It may also comprise a patient instruction, for example "Please lie still". Control may even comprise adaptation of capture parameters for subsequent parts of the capture or a new capture.

A method according to the disclosure for controlling a medical imaging system, in particular an MRI system, a CT system or a PET system, with a controller according to the disclosure comprises the following steps:

applying a control protocol for capture of image data with a capture unit of the medical imaging system, automatically determining a quality metric for the quality of the captured image data by way of the IQA unit of the controller, controlling the medical imaging system on the basis of the quality metric.

Application of a control protocol for capture of image data with a capture unit of the medical imaging system is known in the prior art and is standard practice in medical image capture, for example in MRI systems, CT systems or PET systems.

Automatic determination of the quality metric has already been described above, but is also discussed in the following text.

Controlling the medical imaging system on the basis of the quality metric has also already been described. It is preferred that, in the event of the determined quality metric being outside a specified range, a warning is output by the medical imaging system to a user and/or capture of the image data is repeated with modified capture parameters and preferably on the basis of the quality metric a number of individual slices or segments are reacquired and embedded in the originally captured image data. With regard to the modified capture parameters, this may in particular also mean that another capture strategy may be used, i.e. other control protocols may be selected. Modifications to capture parameters may in particular include initiating a repeat of the most recent control protocol (optionally with one or more modified internal protocol parameters), carrying out an alternative (more suitable) control protocol, changing to another (more suitable) scan strategy, for example a plurality of alternative control protocols, in the case of triggered protocols, a recalibrated trigger or a change of trigger source. A repeat of either the entire capture or merely of the capture of individual image portions or slices may here be initiated.

The disclosure thus provides a possible way of seamlessly integrating image quality assessment algorithms (IQA algorithms) into the image acquisition process with the goal of assessing the diagnostic quality of an image during or shortly after acquisition and immediately instigating appropriate measures for warning or improvement if inadequate image quality has been identified. Using a selection of various IQA algorithms, the system enables modular integration of IQAAs into a diagnostic imaging scanner.

A medical imaging system according to the disclosure is in particular an MRI system, a CT system or a PET system and comprises a controller according to the disclosure and is preferably designed to carry out a method according to the disclosure. The medical imaging system preferably comprises a display unit, wherein the controller is designed to prepare the quality metric, for example a numerical quality value, or assessments based on the quality metric, for example "good"/"bad", and/or to prepare other results of the IQA unit, in particular images reconstructed (in the course of IQA).

The disclosure may in particular be implemented in the form of a computer unit, in particular in a controller for a medical imaging system, with suitable software. The computer unit can to this end have, for example, one or more cooperating microprocessors or the like. In particular, it may be implemented in the computer unit in the form of suitable software program parts. A largely software-based implementation has the advantage that computer units which are already in use can also straightforwardly be retrofitted to operate in the manner according to the disclosure by means of a software or firmware update. In this respect, the object is also achieved by a corresponding computer program product with a computer program which is directly loadable into a storage device of a computer unit, with program parts for carrying out all the steps of the method according to the disclosure when the program is executed in the computer unit. In addition to the computer program, such a computer program product can optionally comprise additional elements such as for example documentation and/or additional components including hardware components, such as for example hardware keys (dongles etc.) for using the software. A computer-readable medium, for example a memory stick, hard disk or other transportable or permanently installed data storage medium on which are stored the program parts of the computer program which can be read in and executed by a computer unit can be used for transport to the computer unit and/or for storage on or in the computer unit.

IQA algorithms may be developed on the basis of simple image processing, signal processing, computer vision methods or machine learning/deep learning methods.

Image processing algorithms suitable as IQAAs might be, for example, algorithms for signal-to-noise calculation and/or for contrast-to-noise calculation.

Example computer vision methods suitable as IQA algorithms may include:

recognition or detection algorithms for identifying features which are associated with a specific kind of image quality problem (e.g. the waviness structure in images impaired by movement artifacts or the repeating structures of an aliasing artifact), or signal processing of time series created by sensors or (partial) image data measurements which directly or indirectly measure various patient movement features, for example heartbeat, respiratory cycle, intestinal movement or body movement, and determine the probability with which the analyzed time series correlate with image quality problems.

IQA algorithms based on machine learning or "deep learning" may be trained such that general image quality or the identification of specific artifacts (e.g. movement artifacts or Gibbs ringing) proceeds in the form of a classification algorithm which provides N image quality assessment classes. Examples might be a binary classifier with the two labels "good" and "bad" for diagnostic image quality or a multi-class classifier with for example the five labels "very good", "good", "satisfactory", "adequate", "unsatisfactory" or of regression algorithms which provide a continuous assessment of image quality within a finite range of values, for example in the interval [0, 1], wherein 0 is the worst and 1 the best possible assessment.

IQA algorithms may be configured such that they work with various kinds of image data, including raw data, various levels of image contrast and measurement configurations. All this data may be present in the image data. One important use case is the image quality assessment of unprocessed 2D or 3D k-space images in MR captures, spatial 2D or 3D images or for time-resolved imaging on the basis of spatial 2D images with temporal 1D images or spatial 3D images with temporal 1D images. For standard use, it is a preferred configuration for an IQA algorithm to generate a quality metric per generated DICOM series, since this is the typical granularity at which images are read or discarded by a radiologist. The abbreviation "DICOM" here stands for "digital imaging and communications in medicine" and is an important standard.

Without restricting generality, specific use cases of IQA algorithms could extend to the analysis of the quality of MR spectroscopy measurements, quantitative T1 or T2 maps or MR fingerprinting maps.

A further variant are IQAAs which offer quality assessment at the subseries level (an individual slice or even a segment of a DICOM). On the basis of this assessment, the damaged slice(s) or segment(s) could, for example, be individually reacquired and embedded into the original slice or series.

According to a preferred controller, at least one IQA algorithm is thus selected from a group which comprises the following elements:

IQA algorithms for signal-to-noise calculation or contrast-to-noise calculation, detection algorithms for identifying features which are connected to a specific kind of image quality problem, algorithms for signal processing of time series created by sensors or (partial) image data measurements which directly or indirectly measure various patient movement features (e.g. heartbeat, respiratory cycle, intestinal movement, body movement), and determine the probability with which the analyzed time series correlate with image quality problems, classification algorithms which provide a number of image quality assessment classes, regression algorithms which provide a continuous assessment of image quality within a finite range of values, IQA algorithms for assessing the quality of unprocessed 2D or 3D k-space images or spatial 2D or 3D images, IQA algorithms for quality assessment for time-resolved imaging.

It is advantageous for an IQA algorithm to have configurable parameters which enable the imaging system user to adapt the sensitivity (or specificity) of the IQA algorithm or of its results in order to recognize inadequate image quality in accordance with the user's preferences. One example might be an IQA algorithm in the form of a deep learning network trained as a regression model which provides a diagnostic quality metric by thresholding a predicted image quality value (e.g. with 0 possibly being the worst and 1 the best possible value). The recognition sensitivity of a bad image can be adapted by raising or lowering the threshold value for classing an image as "bad".

It is preferred for at least some of the IQA algorithms to include information regarding applicability and/or to be configurable by modifying values of specified configurable parameters, preferably the sensitivity and/or specificity of the respective IQA algorithms. It is not absolutely necessary to adjust the IQA algorithms themselves, which might be difficult in particular with trained learning networks, but instead simply to make the further processing of their results configurable. For example, an IQA algorithm may provide a numerical quality value which is modified or interpreted by comparison with a predetermined, configurable range of values.

As indicated above, the IQA unit need not necessarily consist of a number of IQA algorithms but may include still further components. These components may serve in the processing sequence by a plurality of IQA algorithms (as explained in greater detail below) or in further processing the results from a number of IQA algorithms.

A preferred component of the IQA unit is an aggregation unit which is designed to aggregate data. A preferred case for aggregation is assembling a plurality of spatial 2D images to form a spatial 3D image. This may proceed prior to inputting the image data into an IQA algorithm, for example if the latter can only operate with 3D data, or during assessment of its results (e.g. because it only provides an interpretation of 2D images but a quality metric for a 3D image is required). In another exemplary embodiment, control protocols with which a plurality of 2D spatial+1D temporal DICOM data are produced. Depending on which dimensions the IQA algorithm can process, its results would likewise have to be aggregated. The IQA unit could in this case be configured with a 2D spatially based IQA algorithm in such a way that, by aggregating in the time dimension, it can generate a quality metric for the 2D spatial+1D temporal DICOM, such that a user receives a quality metric for the entire DICOM file. The abbreviation DICOM here stands for "digital imaging and communications in medicine", a medical imaging standard.

A preferred object of the disclosure is for a user to determine a quality metric for the entire file for each input DICOM file. Therefore, in general in order to determine the quality metric for p-dimensional image data when using an IQA algorithm with input dimensionality of q, aggregation should proceed over the p-q dimensions provided $p>q$. Where $p=q$, aggregation is not required. Where $p<q$, the IQA algorithm is not or is only partially applicable to the input data.

If the specifications for the input dimension for an IQA algorithm (e.g. spatial 2D) does not correspond to the dimension of the acquired image data (e.g. spatial 3D), the IQA unit should thus have an aggregation option or said aggregation unit for effectively creating a quality metric (e.g. for a DICOM series).

The IQA unit may, however, also have an aggregation unit which is configured to combine results from IQA algorithms or scores or quality metrics and in particular also to process them, for example by calculating an average, median or the maximum or minimum.

A further preferred component of the IQA unit is a scoring unit which is designed to generate a quality metric from an IQA algorithm result. While many IQA algorithms do indeed provide quality values which are already usable, it might be the case that another range of values is required (e.g. 0% to 100% instead of 0 to 10) or the results of a plurality of IQA algorithms have to be combined or results were firstly aggregated. The scoring unit is here ideally configured such that it outputs the desired format for the quality metric.

A further preferred component of the IQA unit is a rating unit which is designed to generate from a result of an IQA algorithm or from a quality value of a scoring unit a result which may be output as an (optionally additional) quality metric. This rating may for example comprise the labels "good" and "bad", or a selection of numbers, for example marks from 1 to 6. A rating may also already comprise a warning, for example the message "bad capture" or control commands for the imaging system to output a warning. In the case of bad quality, the rating unit could even generate information which indicates which parameters should be modified, for example the message "Attention, not enough contrast in capture". The current capture may also simply be stopped on the basis of a binary rating (in the case of a finding of "bad").

It should here be noted that aggregation, scoring or rating may themselves be performed by an IQA algorithm, i.e. that the above-stated components are part of an IQA algorithm. It is, however, also advantageous, in particular in the case of varying configurations of IQA algorithms, for the IQA algorithms to be self-contained (software) components and for aggregation and/or scoring and/or classification to be performed by additional components.

A controller according to an exemplary embodiment may comprise a configuration unit. This configuration unit may be adapted to configure the IQA unit and is adapted to receive and/or generate configuration values and to set the IQA unit, in particular an IQA algorithm or other components for calculating the quality metric, with the configuration values.

In an exemplary embodiment, the configuration unit and the IQA unit may be configured such that a number of the IQA algorithms used are configured or put together on the basis of a user input and/or on the basis of a control protocol used in the capture of the image data and/or that the further processing of results of a number of IQA algorithms is configured.

The configuration unit and the IQA unit thus preferably operate together very closely, wherein the configuration unit may very well be a component of the IQA unit. The IQA unit must here be configurable, which means that the work of its components and/or the interplay of the components is based on parameters, values of which can be modified. The nature and degree of configuration may originate from a user input (explained in greater detail below) or be derived from a control protocol used for image capture.

A number of the IQA algorithms used are preferably configured. This is not necessarily intended to mean only that the number of IQA algorithms is modified (e.g. two instead of one), but also that it is configurable which IQA algorithms are even to be used. For example, it may be specified by a user or implied by a control protocol that a specific regression algorithm and a specific classification algorithm are to be used in combination. However, in the case of another control protocol, a specifically trained deep learning algorithm may be used instead.

The nature (i.e. precisely which component or the processing of which data is configured) or degree (how great the change in the previous parameter values should be or an absolute value for the configuration) may, however, also be specified. For example, the sensitivity or the specificity of the IQA unit or of one of its components may be adapted on the basis of a currently applied control protocol, for example depending on the scan indication and/or depending on the diagnostic regions of interest. Configuration of the IQA unit may here be controlled according to selection data which state which component of the IQA unit is to be configured.

In the case of IQA algorithms which have no configuration parameters (this is the case for example with many deep learning algorithms), in an exemplary embodiment, the configurable parameters may act only on the input and/or output of such an IQA algorithm, namely in particular on the thresholding and/or classification of the outputs and optionally on the nature of the aggregation, for example 2D image-specific results to yield a 3D-specific quality metric.

A specific (graphical) configuration interface is advantageous for configuration by a user. In an exemplary embodiment, the controller may include a configuration user interface, via which a user can generate configuration values for the configuration unit and/or input them into the latter and/or can select a number of IQA algorithms from a plurality of IQA algorithms for generating the quality metric, in particular individually for a number of control protocols.

Configuration values can be input by simply selecting the corresponding parameter and inputting a configuration value. A setting element could, however, also be selected and modified on a graphical interface and this modification would then constitute the corresponding configuration value.

Configuration may also proceed automatically depending on data from other data sources (e.g. RIS) and be indication-driven or patient-specific.

With regard to the selection of IQA algorithms, the user may be provided with a list of available IQA algorithms from which the favored IQA algorithms can be selected. It should, however, be noted here that not all IQA algorithms are equally well (or even at all) suited to all image data. The system may automatically influence this selection.

In an exemplary embodiment, the user may be provided, via the configuration user interface, with a display of a specific number of possible selectable IQA algorithms for use with a control protocol, which are to be used after or during application of this control protocol for determining the quality metric, preferably wherein an automated test of the compatibility of the IQA algorithm with the applied control protocol is performed for this purpose which compares the control protocol specifications (e.g. sequence, reconstruction, protocol parameter set) with predetermined specifications for the applicability of the IQA algorithms and preferably displays only compatible IQA algorithms and/or, if the test of compatibility indicates an incompatibility of an IQA algorithm with a specific control protocol, provides a user with feedback as to which minimum protocol modifications would result in compatibility with which additional IQA algorithm. To this end, the IQA algorithms should have specifications for applicability which can be used by an automated test of the compatibility of the IQA algorithms. In the case of MRI captures, such a specification could read "Only for T2 contrast". Selection of the IQA algorithms in question could then be blocked for image data with other contrasts.

In practice, automated testing of the compatibility of the IQA algorithms in order to assess their compatibility with each scanning step could be carried out at the time of configuration and/or at the start of capture. For this purpose, an automated test of the compatibility of an IQAA with the control protocol can compare the specifications of the stated scanning step (e.g. reconstruction, sequence, protocol parameter set) with specifications for the applicability of the QA algorithms. In particular, at program startup time, a test may proceed as to whether the IQA algorithms are suitable or whether further sensors also have to be connected (e.g. a head coil with beat sensor or an ECG).

If the IQAA protocol compatibility test reveals an incompatibility with a specific scanning step, this could for example display only compatible IQAAs which are to be configured for this scanning step and/or provide the user of the scanner with feedback as to which minimum modifications to the protocol would result in compatibility with which additional IQAAs.

In an exemplary embodiment, if one or more IQA algorithms are configured for a scanning step, the IQA algorithms in question may be carried out automatically directly after data acquisition for this scanning step.

Depending on the nature of the IQAA, additional configuration settings may be present, for example an option for adapting the sensitivity of QA algorithms for recognizing an image quality problem (e.g. low or moderate or high sensitivity or a continuous threshold value within a specific scale, e.g. 0.0 to 1.0).

IQA algorithms may moreover have configuration options which determine how IQA algorithms, which are based on n-dimensional input data, can be aggregated in order to obtain a quality assessment for an m-dimensional image series. For example, an IQA algorithm which is capable of generating quality assessments for individual image frames (e.g. spatial 2D images) may provide a configuration parameter as to how the assessments of the 2D frames of an image should be aggregated in order to generate a quality assessment for the complete image series (e.g. a spatial 3D image). Available score aggregation options may involve calculating the average, median, minimum or maximum of quality metrics of image frames within an image series.

In an exemplary embodiment of the controller, the latter, in particular the IQA unit thereof or a number of IQA algorithms of the IQA unit or the configuration unit, may be configured to (automatically) modify at least one configuration value on the basis of a currently applied control protocol. In an exemplary embodiment, a detection threshold of the IQA unit, in particular of an IQA algorithm of the IQA unit, may be set and/or for a number of IQA algorithms which are to be used in the IQA unit for determining the quality metric to be selected on the basis of a currently applied control protocol.

It should be noted that, on medical images (or data in general), specific data points are of particular relevance to reading, while other data points are less important. For example, in spatial 2D or 3D images, the background pixels are not normally of great relevance (apart from for the assessment of specific artifacts, for example movement or signal-to-noise ratio or the presence of movement artifacts), while for example in a neurological scan white and gray matter are of great relevance. It is accordingly advantageous to weight the significance of an individual data point for the generation of a quality metric.

In an exemplary embodiment of the controller, the latter, in particular the IQA unit or the configuration unit, may be designed, on the basis of a currently applied control protocol, to (numerically) acquire in a relevance map the relevance of data points, in particular data points for representing organs or body regions, in the image data for a medical investigation connected with this control protocol. In an exemplary embodiment, a spatially weighted quality metric may be created on the basis of this relevance map, preferably wherein data points which are of less relevance to a predetermined investigation are considered in the quality metric with a lower weighting than data points which are more relevant to the specified investigation. This may, for example, be achieved in that peripheral or background pixels receive a lower weighting than pixels of the anatomical target structures of interest. A control protocol or a scan indication may preferably point toward well-defined regions of interest (ROI) or anatomical tissue which are of primary interest to the respective diagnostic question, for example an eye scanning program requires good image quality for the eyes and visual nerves. In an exemplary embodiment, the IQA unit should attach a greater weight to the data from a diagnostic target region than to other data for generation of the quality metric. In an exemplary embodiment, the IQA unit may have a kind of direct or indirect anatomical understanding, for example by using point of reference recognition, object recognition, atlas-based localization capabilities or segmentation-based localization capabilities or any combination of the stated or similar methods. To this end, IQA algorithms of the IQA unit may have both anatomy-specific and indication-specific image quality assessment in order to completely model a radiologist's requirements for reading images. In an exemplary embodiment of0 the IQA algorithms, patient compliance, condition-specific features (e.g. dementia, Parkinson's disease, fetus) or situation-related statuses (e.g. time-critical emergency) could be considered by the IQA algorithms in order to adapt the identification/acceptance threshold on a case-by-case basis. Adaptation may also be indication-driven, which can in particular be modeled via a predetermined strategy.

In an exemplary embodiment a controller, the IQA unit may comprises a plurality of IQA algorithms and may be designed or settable such that, on the basis of two or more IQA algorithms, a quality metric for the quality of the data from a single image capture is determined. In an exemplary embodiment:

in a parallel configuration, a plurality of IQA algorithms generate an individual result from the image data and, on the basis of these results, a combined quality metric, preferably an arithmetic or weighted average, a median value, a minimum or a maximum of the results, is determined, in a serial configuration, a first IQA algorithm firstly generates a result and, in the event that the result is located in a predetermined uncertainty range, a further IQA algorithm generates a further result and a quality metric is determined from the result of the last IQA algorithm or on the basis of a plurality of results, a subgroup of the IQA algorithms is configured in parallel and is configured serially with a number of other IQA algorithms or subgroups of IQA algorithms.

In an exemplary embodiment, the setting as to which IQA algorithms are carried out in parallel configuration and which in serial configuration is determined by:

a preset by the clinical operator, a priority of an image quality problem at which a specific IQA algorithm of the IQA unit is directed (e.g. high priority first), a frequency of the occurrence of an image quality problem at the clinical center (e.g. frequent occurrence first), available computing resources (e.g. more IQA algorithms in parallel if more resources are available), nature and resource consumption of the (configured) IQA algorithms (e.g. relevant to the grouping), technical imperatives (e.g. image analysis can only take place if an image is available and sensor analysis only if signals are available).

In the case of partial or complete sequence assessment by IQAAs, an IQAA (or a subgroup of IQAAs) will preferably only assess image quality if the preceding IQAA (or a subgroup of IQAAs) has determined a minimum image quality. Using this approach, it is possible to optimize assessment time, computing resources and above all the time until measures are initiated. For example, if a first IQAA identifies serious artifacts, it may not be necessary to carry out an additional assessment using further IQAAs since the first IQAA has already assessed the captured images as being non-diagnostic. Additional assessment time can thus be saved and a remedial measure (e.g. repetition of the most recent scanning step) can be carried out immediately.

In radiology, the image quality required to make a diagnostic finding is frequently dependent on the scan indication, i.e. on the diagnostically relevant type of feature and structure size. An advantageous IQA unit therefore automatically adapts a detection threshold depending on the scan indication and/or enables the user to set indication-specific detection thresholds for IQA algorithms or the processing of results from IQA algorithms. For example, diagnosing multiple sclerosis in the brain requires a much higher image sharpness and resolution than does confirming/disproving a large tumor. The detection threshold for a scan with indication of MS should therefore be set to more sensitive than for a large tumor scan.

Results of a number of used IQA algorithms are preferably displayed to a user on a scan user interface in order to inform the user of the imaging system about the quality of the acquired images during or directly after acquisition and assessment by the IQA algorithms. If an image quality problem is identified, the user can immediately take corrective measures.

In an exemplary embodiment, the IQA algorithms may be independent modules which can be configured such that, as preferred by the user, they are automatically carried out at each image acquisition step in an MR investigation.

In a method according to an exemplary embodiment, the image data is data from a DICOM series and/or MR spectroscopy measurements, quantitative T1 or T2 maps or MR fingerprinting maps. The quality metric is here preferably generated for the entire DICOM series, a 3D image, 3D raw data, a 2D image, 2D raw data, a number of slices in a stack, a segment of an image or a k-space segment.

In a method according to an exemplary embodiment, in the event that an input dimension specification of the IQA unit does not correspond to the dimension of the acquired image data, data aggregation is performed. In an exemplary embodiment, the IQA unit may have a configuration parameter which indicates how aggregation should be performed and this configuration parameter may be configured via a configuration user interface. The IQA unit here preferably has a selection of score aggregation options from the group including calculation of the average, calculation of the median, calculation of the minimum and calculation of the maximum of quality metrics of subimages and/or results from IQA algorithms. It should be possible to select the calculation in the course of configuration. An average value or a median or a minimum or a maximum is thus calculated from a plurality of results from used IQA algorithms or a plurality of subimages (optionally weighted).

If sufficient computing power is available, aspects may be integrated locally in hardware of the medical imaging system, for example scanner hardware, or other hardware directly connected to the scanner in order, by avoiding network latency, to keep assessment time as short as possible.

Components of the disclosure may, however, also take the form of a "cloud service". Such a cloud service serves to process data, in particular using artificial intelligence, but may also be a service based on conventional algorithms or a service in which interpretation is provided in the background by humans. In general, a cloud service (hereinafter also denoted "cloud" for short) is IT infrastructure in which for example storage space or computing power and/or application software is provided across a network. Communication between the user and the cloud here proceeds by way of data interfaces and/or data transfer protocols. In an exemplary embodiment, the cloud service may be provide both computing power and application software.

In an exemplary method, image data is provided to the cloud service via the network. The cloud service comprises a computer system, for example a computer cluster, which can carry out the inventive method (in particular an IQA unit as a software module) and which generally does not comprise the user's local computer. This cloud may in particular be provided by the medical facility which also provides the medical systems. For example, the image data are sent via an RIS (radiology information system) or PACS to a (remote) computer system (the cloud). The cloud computer system, the network and the medical system preferably constitute an interconnected system in data technology terms. The method may here be implemented using a command constellation in the network. The data calculated in the cloud ("result data") is subsequently sent back via the network to the user's local computer.

According to an exemplary controller, the IQA unit is a software module on processing hardware of the scanner hardware, on a peripheral device of a medical imaging system, in particular an MRI system, CT system or PET system, or in a cloud.

The configuration user interface is preferably integrated as a software module in a graphical scanner user interface.

The following figures only include those elements which are essential to or of assistance in understanding the disclosure. Accordingly, no slice selection gradients, for example, are shown, although they may very well be present in the pulse sequence.

FIG. 1 illustrates a magnetic resonance tomography system 1 as an example of a medical imaging system 1. In an exemplary embodiment, the system 1 may include a magnetic resonance scanner 2 with an investigation chamber 3 or patient tunnel, in which a patient or test subject, in whose body the actual object under investigation O is located, is positioned on a couch 8. Although in the example shown the object under investigation O is depicted in the torso, diffusion tensor imaging is also often used for brain captures, since it is particularly well suited to depicting neurological structures.

The magnetic resonance scanner 2 may include a main field magnet system 4, a gradient system 6 and an HF transmit antenna system 5 and an HF receive antenna system 7. In the exemplary embodiment shown, the HF transmit antenna system 5 is a whole body coil permanently installed in the magnetic resonance scanner 2, whereas the HF receive antenna system 7 consists of local coils to be arranged on the patient or test subject (only indicated in the figure by an individual local coil). In principle, however, the whole body coil can also be used as the HF receive antenna system and the local coils as the HF transmit antenna system, provided that these coils can in each case be switched to different operating modes. The main field magnet system 4 is here configured, as conventional, such that it generates a main magnetic field in the longitudinal direction of the patient, i.e. along the longitudinal axis extending in the z direction of the magnetic resonance scanner 2. As conventional, the gradient system 6 comprises individually drivable gradient coils in order to be able to switch gradients mutually independently in the x, y or z direction. The magnetic resonance scanner 2 additionally contains shim coils (not shown) which may be of conventional construction.

The magnetic resonance tomography system shown is a whole body system with a patient tunnel into which the entire patient can be introduced. In principle, however, the disclosure can also be used on other magnetic resonance tomography systems, for example with a C-shaped housing open at the side.

The magnetic resonance tomography system 1 furthermore has a central control device (controller) 13 which is used to control the MR system 1. This central controller 13 comprises a sequence control unit (sequence controller) 14. The sequence controller 14 may be configured to control the sequence of high-frequency pulses (HF pulses) and of gradient pulses as a function of a selected control protocol P for capturing a plurality of slices in a volume region of interest of the object under investigation within a measurement session. Various control protocols P for different measurements are conventionally stored in a memory 19 and can be selected (and if need be optionally modified) by an operator and then used for performing the measurement. In an exemplary embodiment, the controller 13 (and/or one or more components therein) may include processing circuitry that is configured to perform one or more functions of the controller 13 and/or respective functions of the component (s) therein.

In order to output the individual HF pulses of a pulse sequence of a control protocol P, the central controller 13 has a high-frequency transmit device 15 which generates and amplifies the HF pulses and feeds them into the HF transmit antenna system 5 via a suitable interface (not shown in detail). In order to switch the gradient pulses in coordinated manner with the predetermined control protocol P, the controller 13 has a gradient system interface 16 for controlling the gradient coils of the gradient system 6. The gradient pulses could be applied via this gradient system interface 16. The sequence controller 14 communicates suitably with the high-frequency transmit device 15 and the gradient system interface 16 to carry out the control protocol P.

The controller 13 moreover has a high-frequency receive device 17 (which likewise suitably communicates with the sequence controller 14), in order to receive, in coordinated manner, the magnetic resonance signals within the read-out window specified by the control protocol P by way of the HF receive antenna system 7 and so acquire the raw data.

A reconstruction unit (reconstructor) 18 here receives the acquired raw data and reconstructs image data B therefrom. This reconstruction also generally proceeds on the basis of parameters which may be specified in the respective control protocol P. This image data may then for example be stored in a memory 19.

Since a person skilled in the art is in principle aware in detail how suitable raw data can be acquired by applying HF pulses and switching gradient pulses and how MR images or parameter maps can be reconstructed therefrom, these matters are accordingly not explained in greater detail here.

The controller 13 comprises an image quality assessment (IQA) unit 20 which can assess the quality of the image data B. The IQA unit may also be referred to as IQ assessor 20. This IQA unit 20 is described in greater detail below. In this example, reconstructed MR images are used as the image data B for the IQA unit 20. The raw data or processed raw data could, however, also be used directly as the image data B.

The central controller 13 can be operated via a terminal 11 with an input unit 10 and a display unit 9, via which the entire magnetic resonance tomography system 1 may thus also be operated by an operator. Magnetic resonance tomography images may also be displayed on the display unit 9 and, using the input unit 10, optionally in combination with the display unit 9, measurements can be planned and started and in particular control protocols P selected and optionally modified.

This terminal may be part of the MRI system 1 and can definitely be controlled by the controller 13 for example for outputting information regarding the quality of the captured MR images or warnings if quality is inadequate.

The magnetic resonance tomography system 1 according to the disclosure and in particular the controller 13 may furthermore also have a plurality of further components which are not individually shown here but are conventional in such systems, such as for example a network interface in order to connect the entire system to a network and enable exchange not only of raw data and/or image data or parameter maps but also of further data, such as for example patient-related data or control protocols.

FIG. 2 shows an exemplary embodiment of an IQA unit 20 according to the disclosure and a configuration unit 25. The IQA unit 20 comprises an IQA algorithm 21 which determines the quality of incoming image data B and outputs a result E (here depicted in the form of an image stack), an aggregation unit (aggregator) 22 which aggregates the results of the IQA algorithm 21, a scoring unit (scorer) 23 which generates a numerical value (the "score" S) as a possible quality metric S from the aggregated results E of the IQA algorithm 21, and a rating unit (rater) 24 which generates a "rating" R as a possible quality metric R from the score, for example a statement as to whether quality is "good" or "bad". The aggregation unit 22 is present here because the IQA algorithm 21 in this example provides statements about 2D slices of a 3D image as its result E and these are to be assembled into a combined statement about the 3D image. The scoring unit 23 may be integrated into the aggregation unit 22, such that the latter directly outputs a score S as the quality metric. If only a numerical value is required, it is possible to dispense with the rating unit 24. In an exemplary embodiment, the IQA unit 20 includes a memory configured to store one or more IQA algorithms 21 and processing circuitry that is configured to perform one or more functions of the IQA unit 20. The memory of the IQA unit 20 may also store one or more instructions or computer programs, that when executed by the processing circuitry (e.g., processor(s)), performs the function(s) of the IQA unit 20.

Components of the IQA unit 20 may be configured, for example a suitable IQA algorithm selected, via the configuration unit 25. This example uses aggregation data A and threshold data T to configure aggregation of the results E and to specify a limit value for the rating unit 24 from which quality is inadequate. If, for example, a score S indicating image quality between 0% (worst) and 100% (optimum) were generated, 30% may, for example, be specified as threshold data T. If a score S is below 30%, the rating unit 24 would interpret the image data B as "bad" and otherwise as "good". There may, of course, also be further gradations.

By way of a configuration user interface 26 which communicates with the configuration unit 25, a user can specify which components of the IQA unit 20 are to be configured in what manner.

When a control protocol P (see FIG. 1) is carried out, image data B is fed into the IQA unit 20 during image data acquisition in parallel or serially with the image reconstruction process.

The parameters of the control protocol P are ideally automatically checked in order to establish whether the setting is applicable to the IQA algorithms 21 used. If applicable and as configured, a threshold value is applied for generation of the quality metric S, R. In addition to the computational configuration options, the output can preferably also be configured: the option may be offered either to display aggregated quality metrics S, R or the image series of the diagnostic image quality class or both.

A preferred IQA unit 20 may have both anatomy-specific and indication-specific image quality assessment in order to completely model a radiologist's requirements for reading images. In a preferred embodiment, patient compliance features, condition-specific features (e.g. dementia, Parkinson's disease, fetus) or situation-related statuses (e.g. time-critical emergency) could be considered by the IQAA in order to adapt the identification/acceptance threshold on a case-by-case basis.

FIG. 3 shows the mode of operation of the IQA unit 20 or the course of a quality determination. A magnetic resonance scanner 2 receives control data according to a control protocol P from a sequence controller 14 for image capture. The image data B can be forwarded to the IQA unit 20 directly as raw data (continuous arrow) or as reconstructed images from a reconstruction unit 18 (dashed arrow). The IQA unit 20 is configured by way of a configuration unit 25 which in this case automatically derives specifications for threshold data T directly from the control protocol P. The user receives as the result reconstructed images from the reconstruction unit 18 together with a score S and a rating R for these images as the quality metric S, R.

FIG. 4 shows a serial combination of IQA algorithms, 21, 21a in an IQA unit 20. The IQA unit may contain two or more IQA algorithms 21, 21a which are used in combination with one another. This figure shows a serial combination in which a first IQA algorithm 21 is used which determines the quality of image data B and forwards the result E to a second IQA algorithm 21a. If the result indicates that the quality of the image data is not inadequate, the second IQA algorithm 21a would determine quality. This may be continued with further IQA algorithms as indicated by the ellipsis. In this example, the results E from the first and second IQA algorithms 20, 21a flow into the quality metric S, R which here comprises a score S and a rating R.

FIG. 5 shows a parallel combination of two IQA algorithms, 21, 21a in an IQA unit 20. The IQA unit 20 may very well contain still more or more IQA algorithms 21, 21a which are further used in parallel or serially (see FIG. 4) in a combination. The two IQA algorithms 21, 21a here obtain and process the image data B in parallel and each of the two results E is forwarded to an individual scoring unit 23. The outputs from these scoring units 23 are combined in an aggregation unit 22 and a combined score S is formed which is forwarded to a rating unit 24. The combined score S and rating R then provide the quality metric S, R. It should be noted that the (optionally adapted) aggregation unit 22 could also be used to combine results of IQA algorithms 21, 21a and the combined results E could be input into a common scoring unit 23. Scores S and ratings R for each individual IQA algorithm 21, 21a could also be output without being combined.

In FIGS. 4 and 5, the IQA algorithms 21, 21a may be configured as indicated in FIG. 2, wherein the configuration unit 25 should to this end be configured such that the used IQA algorithms 21, 21a may be selected, or their sequence optionally adapted, and the processing of their results may be individually set for each result.

The two IQA algorithms 21, 21a could calculate individual quality assessments and diagnostic image quality classes which can also be displayed, for example on the display unit 9 of FIG. 1. The IQA unit preferably generates a combined quality metric S, R, which comprises an aggregated image quality assessment or an aggregated diagnostic image quality class, on the basis of the results of all the configured IQA algorithms 21, 21a for each acquired image series. The aggregation method for combining image quality is preferably configurable in a configuration user interface 26 (see FIG. 2). Available aggregation methods may for example comprise calculating the arithmetic or weighted average, median value, minimum or maximum of quality assessments of the individual configured IQA algorithms 21, 21a.

Figure 6:
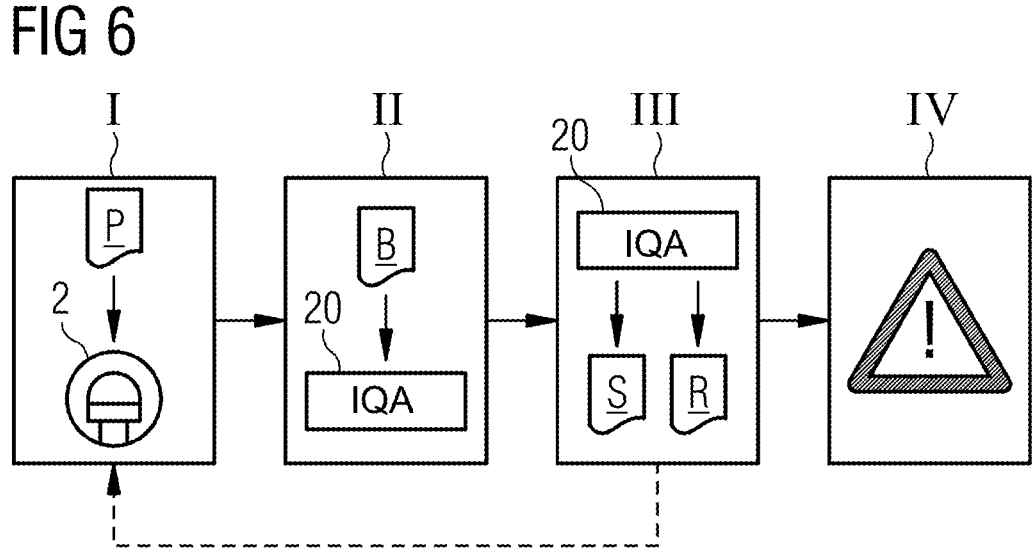
FIG. 6 shows a flowchart of a method according to an exemplary embodiment of the disclosure.

FIG. 6 shows a block diagram of an exemplary embodiment of a method according to the disclosure for controlling a medical imaging system 1, for example an MRI system 1 as shown in FIG. 1.

In step I, a control protocol P for capture of image data B with a capture unit 2 of the medical imaging system 1 is applied.

In step II, the image data is sent to an IQA unit 20, for example an IQA unit 20 as previously described.

In step III, a quality metric S, R for the quality of the captured image data B is automatically determined by way of the IQA unit 20 of the controller 13.

In step IV, the medical imaging system 1 is controlled on the basis of the quality metric S, R. A warning sign shows here that, in the event of the determined quality metric S, R being outside a specified range, a warning is output to a user by the medical imaging system 1. Capture of the image data B with modified capture parameters could, however, also be repeated or, on the basis of the quality metric S, R, a number of individual slices or segments could be reacquired and embedded into originally captured image data B.

Figure 7:
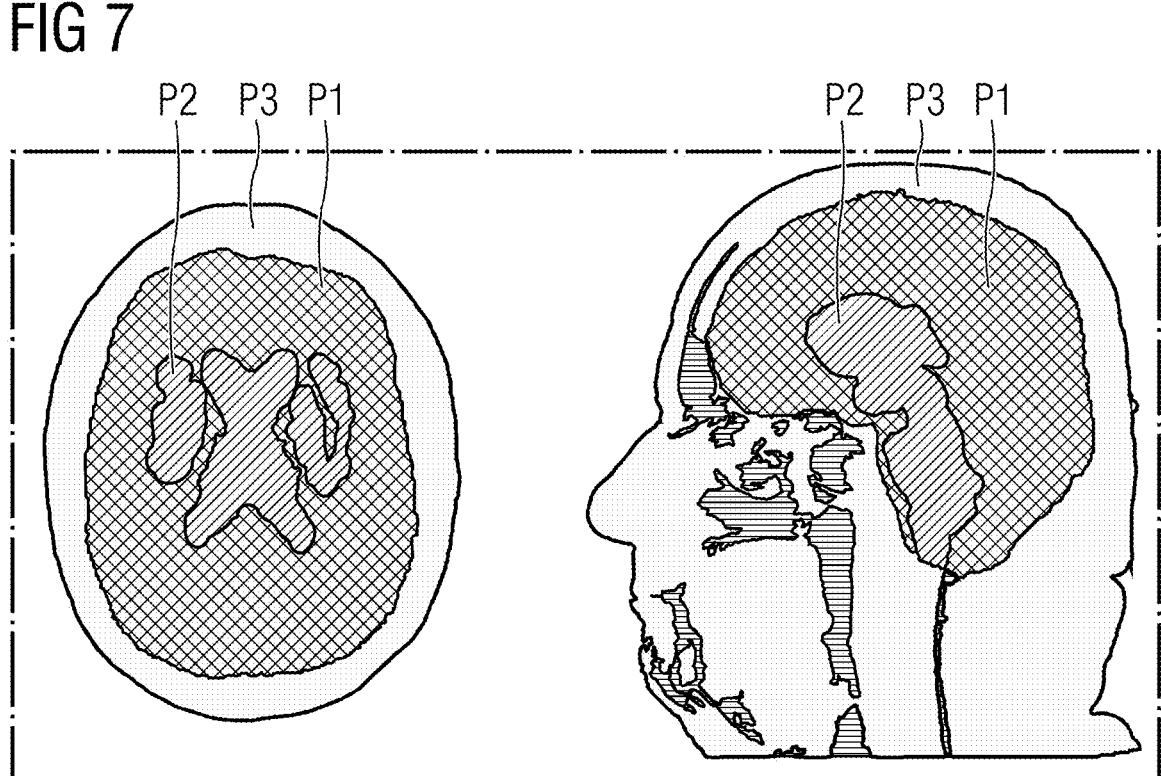
FIG. 7 shows a spatial prioritization of regions according to an exemplary embodiments of the disclosure.

FIG. 7 shows a spatial prioritization of regions in a human head. The crosshatched regions are regions of high priority P1, the obliquely shaded regions are regions of moderate priority P2, and the unshaded regions are regions of low priority P3.

By way of this prioritization, it is possible to generate a weighted quality metric (S, R) in which the quality of the regions of high priority P1 is more highly rated than the quality of the regions of moderate or low priority P2, P3.

It should finally once again be noted that the method described above in detail and the depicted MRI system 1 are merely exemplary embodiments which can be modified in the most varied manner by a person skilled in the art without departing from the scope of the disclosure. Furthermore, use of the indefinite article "a" does not rule out the possibility of a plurality of the features in question also being present. Likewise, the terms "unit" and "module" do not rule out the possibility of the components in question consisting of a plurality of interacting sub-components which may optionally also be spatially distributed. The phrase "a number" means "at least one".

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A controller adapted to control a medical imaging system, comprising:
   an interface configured to interface with one or more components of the medical imaging system; and
   an image quality assessor (IQA) storing one or more IQA algorithms and configured to:
      determine, after or during application of a control protocol adapted capture image data by the medical imaging system, a quality metric assesses a quality of the image data; and
      automatically control the medical imaging system based on the quality metric, wherein the one or more IQA algorithms comprises:
      an IQA algorithm configured to: perform a signal-to-noise calculation, perform a contrast-to-noise calculation, perform a quality assessment for time-resolved imaging, or assess a quality of unprocessed two-dimensional (2D) or three-dimensional (3D) k-space images or spatial 2D or 3D images;
      a detection algorithm configured to identify features associated with an image quality problem;
      an IQA classification algorithm configured to provide a number of image quality assessment classes;
      an IQA regression algorithm configured to provide a continuous assessment of image quality within a finite range of values; and/or
      an IQA algorithm configured to: perform signal processing of time series created by sensors or image data measurements which directly or indirectly measure various patient movement features, and determine a probability with which an analyzed time series correlates with image quality problems,
   wherein at least some of the one or more IQA algorithms include information regarding specifications for applicability and/or are configurable by modifying values of specified configuration parameters of the respective IQA algorithms.

2. The controller as claimed in claim 1, wherein the specified configuration parameters include a sensitivity and/or specificity of the respective IQA algorithms.

3. The controller as claimed in claim 1, comprising:
   a configuration unit adapted to: receive and/or configure configuration values, and set the IQA with the configuration values, including setting one or more IQA algorithms or one or more other components configured to calculate the quality metric with the configuration values, wherein the configuration unit and the IQA are configured such that:

a number of the one or more IQA algorithms used are configured based on a user input and/or a control protocol used in capturing the image data, and/or further processing of results from the number of the one or more IQA algorithms is configured.

4. The controller as claimed in claim 3, comprising:

a configuration user interface configured to: generate configuration values for the configuration unit based on user input, accept user input of the configuration values for the configuration unit, and/or facilitate a selection of a number of IQA algorithms from the one or more IQA algorithms configured to generate the quality metric, wherein the configuration user interface is configured to display possible selectable IQA algorithms of the one or more IQA algorithms for use with a control protocol, which are usable after or during application of this control protocol for determining the quality metric, wherein the display of possible selectable IQA algorithms is based on an automated compatibility test of the control protocol that compares specifications of the control protocol with predetermined specifications for applicability of the IQA algorithms, and wherein configuration user interface is configured to display the compatible IQA algorithms, and/or, in response to the compatibility test indicates an incompatibility of an IQA algorithm with a specific control protocol, provide the user with feedback as to which minimum protocol modifications would result in compatibility with which additional IQA algorithm.

5. The controller as claimed in claim 4, wherein the facilitation of the selection of the number of IQA algorithms from the one or more IQA algorithms configured to generate the quality metric is individually for a number of control protocols.

6. The controller as claimed in claim 1, wherein the IQA is configured to:

modify at least one configuration value based on a currently applied control protocol and set a detection threshold of the IQA, including setting a detection threshold of an IQA algorithm of the IQA, and/or based on a currently applied control protocol, select a number of the one or more IQA algorithms to be used in the IQA to determine the quality metric.

7. The controller as claimed in claim 1, wherein the IQA is configured to: based on a currently applied control protocol, numerically acquire, in a relevance map, relevance of data points representing organs or body regions in the image data for a medical investigation connected with the control protocol, wherein a spatially weighted quality metric is created based on the relevance map, data points which are of less relevance to a predetermined investigation being considered in the quality metric with a lower weighting than data points which are more relevant to the specified investigation.

8. The controller as claimed in claim 1, wherein:

the IQA comprises a plurality of IQA algorithms and is configured to determine, based on two or more IQA algorithms of the plurality of IQA algorithms, a quality metric for the quality of the image data from an image capture, in a parallel configuration, the plurality of IQA algorithms are configured to generate, in each case, an individual result from the image data and, based on the generated individual results, a combined quality metric, in a serial configuration, a first IQA algorithm of the plurality of IQA algorithms is configured to firstly generate a first result and, in response to the first result being located in a predetermined uncertainty range, a second IQA algorithm of the plurality of IQA algorithms is configured to generate a second result, a quality metric being determined from the second result or based on the first and second results, a subgroup of the plurality of IQA algorithms is configured in parallel and another subgroup of the plurality of IQA algorithms is configured serially, wherein a determination as to which IQA algorithms are carried out in the parallel configuration and which IQA algorithms are carried out in the serial configuration is based on:

a preset by a clinical operator, a priority of an image quality problem at which a specific IQA algorithm of the IQA is directed, a frequency of the occurrence of an image quality problem at the clinical center, available computing resources, the nature and resource consumption of the IQA algorithms, and/or technical imperatives.

9. A medical imaging system comprising a controller as claimed in claim 1.

10. The medical imaging system as claimed in claim 9, further comprising a display, wherein the controller is configured to:

prepare the quality metric or assessments based on the quality metric, and/or prepare reconstructed images based on one or more results of the IQA.

11. The controller as claimed in claim 1, wherein the modified values of the specified configuration parameters include a sensitivity and/or specificity of the respective IQA algorithms.

12. A method for controlling a medical imaging system, with a controller, comprising:

applying a control protocol adapted to capture image data with a scanner of the medical imaging system;

automatically determining, by image quality assessor (IQA) of the controller, a quality metric for a quality of the captured image data;

in response to an input dimension specification of the IQA not corresponding to a dimension of the acquired image data, performing data aggregation, wherein the IQA includes:

(i) a configuration parameter indicative of the data aggregation to be performed, the configuration parameter being configurable via a configuration user interface, and (ii) a selection of score aggregation options including calculation of the average, calculation of the median, calculation of the minimum and calculation of the maximum of quality metrics of subimages and/or results from IQA algorithms selectable in the course of configuration; and controlling the medical imaging system based on the quality metric, wherein, in response to the determined quality metric being outside a specified range, the medical imaging system is controlled to: (i) output a warning to a user, and/or (ii) repeat the capture of the image data with modified capture parameters and, based on the quality metric, require a number of individual slices or segments and embed the required individual slices or segments into originally captured image data.

13. The method as claimed in claim 12, wherein the image data is data from a digital imaging and communications in medicine (DICOM) series and/or magnetic resonance (MR) spectroscopy measurements, quantitative T1 or T2 maps, or MR fingerprinting maps, and wherein the quality metric is generated for the entire DICOM series, a 3D image, 3D raw data, a 2D image, 2D raw data, a number of slices in a stack, a segment of an image, or a k-space segment.

14. A non-transitory computer-readable storage medium comprising computer code, which, on execution by a processor, causes the processor to perform the method as claimed in claim 12.

15. A controller adapted to control a medical imaging system, comprising:
an interface configured to interface with one or more components of the medical imaging system; and
an image quality assessor (IQA) storing one or more IQA algorithms and configured to: determine, after or during application of a control protocol adapted capture image data by the medical imaging system, a quality metric assesses a quality of the image data; and automatically control the medical imaging system based on the quality metric, wherein:
(a) the controller further comprises: (i) a configuration unit configured to: receive and/or configure configuration values, and set the IQA with the configuration values, including setting one or more IQA algorithms or one or more other components configured to calculate the quality metric with the configuration values, wherein the configuration unit and the IQA are configured such that: a number of the one or more IQA algorithms used are configured based on a user input and/or a control protocol used in capturing the image data, and/or further processing of results from the number of the one or more IQA algorithms is configured, and (ii) a configuration user interface configured to: generate configuration values for the configuration unit based on user input, accept user input of the configuration values for the configuration unit, and/or facilitate a selection of a number of IQA algorithms from the one or more IQA algorithms configured to generate the quality metric, wherein the configuration unit and the IQA are configured such that: a number of the one or more IQA algorithms used are configured based on a user input and/or a control protocol used in capturing the image data, and/or further processing of results from the number of the one or more IQA algorithms is configured, wherein the configuration user interface is configured to display possible selectable IQA algorithms of the one or more IQA algorithms for use with a control protocol, which are usable after or during application of this control protocol for determining the quality metric, the display of possible selectable IQA algorithms being based on an automated compatibility test of the control protocol that compares specifications of the control protocol with predetermined specifications for applicability of the IQA algorithms, wherein the configuration user interface being configured to display the compatible IQA algorithms, and/or, in response to the compatibility test indicates an incompatibility of an IQA algorithm with a specific control protocol, provide the user with feedback as to which minimum protocol modifications would result in compatibility with which additional IQA algorithm; or
(b) the IQA comprises a plurality of IQA algorithms and is configured to determine, based on two or more IQA algorithms of the plurality of IQA algorithms, a quality metric for the quality of the image data from an image capture, wherein, in a parallel configuration, the plurality of IQA algorithms are configured to generate, in each case, an individual result from the image data and, based on the generated individual results, a combined quality metric, wherein, in a serial configuration, a first IQA algorithm of the plurality of IQA algorithms is configured to firstly generate a first result and, in response to the first result being located in a predetermined uncertainty range, a second IQA algorithm of the plurality of IQA algorithms is configured to generate a second result, a quality metric being determined from the second result or based on the first and second results, wherein a subgroup of the plurality of IQA algorithms is configured in parallel and another subgroup of the plurality of IQA algorithms is configured serially, wherein a determination as to which IQA algorithms are carried out in the parallel configuration and which IQA algorithms are carried out in the serial configuration is based on: a preset by a clinical operator, a priority of an image quality problem at which a specific IQA algorithm of the IQA is directed, a frequency of the occurrence of an image quality problem at the clinical center, available computing resources, the nature and resource consumption of the IQA algorithms, and/or technical imperatives.

16. A medical imaging system comprising a controller as claimed in claim 15.

17. The medical imaging system as claimed in claim 16, further comprising a display, wherein the controller is configured to:
prepare the quality metric or assessments based on the quality metric, and/or
prepare reconstructed images based on one or more results of the IQA.

* * * * *